INVENTOR
Herbert LANG

Oct. 29, 1968 H. LANG 3,407,793
ELECTRONIC CONTROLLER FOR DIESEL ENGINES
Filed April 17, 1967 3 Sheets-Sheet 3
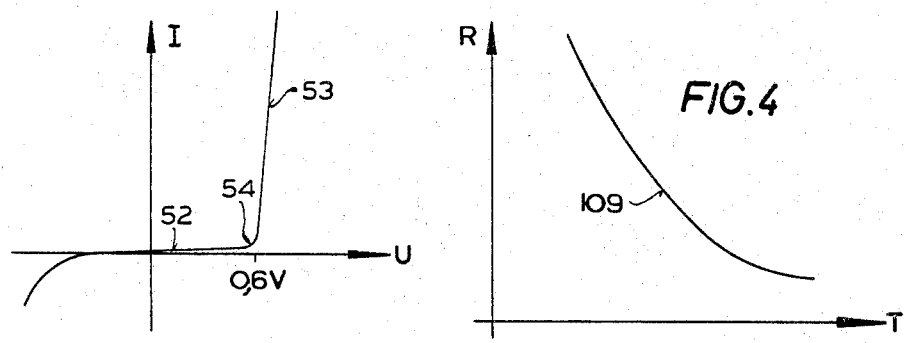
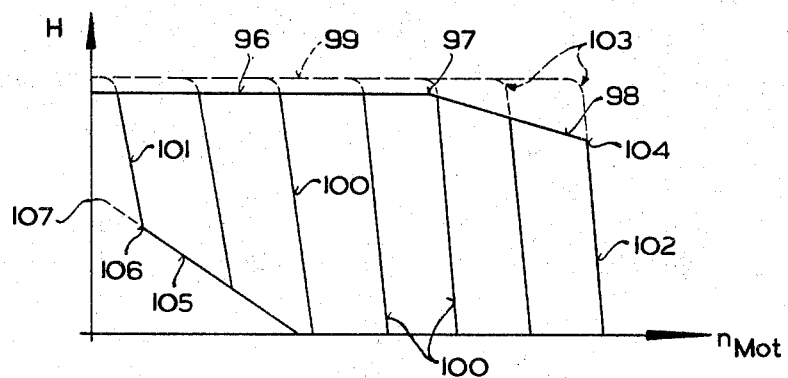
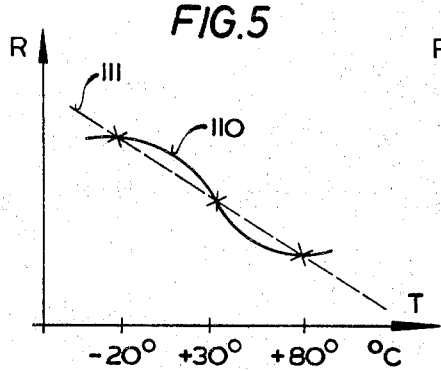
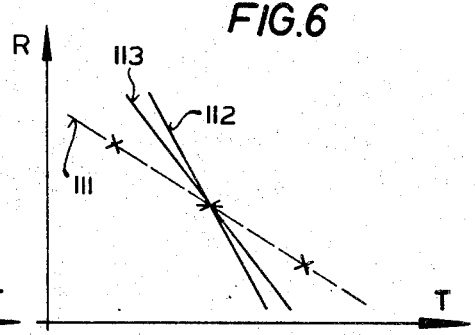
INVENTOR
Herbert LANG United States Patent Office 3,407,793
Patented Oct. 29, 1968

3,407,793
ELECTRONIC CONTROLLER FOR
DIESEL ENGINES
Herbert Lang, Asperg, Germany, assignor to Robert Bosch
G.m.b.H., Stuttgart, Germany, a limited-liability company of Germany
Filed Apr. 17, 1967, Ser. No. 631,331
Claims priority, application Germany, May 20, 1966,
B 87,206
15 Claims. (Cl. 123—102)

ABSTRACT OF THE DISCLOSURE

The position of the fuel controller associated with the injection pump of a diesel engine is electrically controlled by a fixed source of electrical potential having high internal resistance in parallel with a group of nonlinear transistor circuits; one of the nonlinear circuits sets operating and maximum speed, another minimum speed at low injection quantities, and a third provides for load-power matching; the transfer characteristics of the transistor circuits differ and they are connected by diodes in parallel with the fixed source of potential; the input to the nonlinear circuits is controlled by a speed-proportional signal obtained from a tachometer generator connected to the engine; the operating speed setting nonlinear circuit is additionally responsive to setting of an operator-controllable pedal. The potential of the lower internal resistance nonlinear circuits will override that of the fixed source.

---

The present invention relates to an electronic controller for diesel engines to control the position of a fuel regulator, which regulates the amount of fuel injected during the working strokes of the diesel engine, and more particularly to such a controller coupled to a control element, the position of which is adjustable by an operator to regulate the speed of the diesel engine in accordance with its position, the electronic controller maintaining the operating point of the diesel engine always within the load-speed diagram of the particular diesel engine with which it is associated.

Controls of the type of the present invention have the characteristic, that for any particular position of a manually settable control element, such as a control pedal, there is a corresponding particular speed of the engine. Such controllers are used primarily for municipal or public service vehicles, such as street-cleaning machinery, tractors or the like, which are to operate at a steady, constant speed. Mechanical, pneumatic or hydraulic controls for diesel engines are known; their design and construction require high precision. Depending upon the characteristics of the diesel engine, such controllers must meet special requirements: they must provide for maximum effectiveness of the engine, that is operation just below the point at which excessive fuel is injected, which will cause smoking or emission of fumes; a larger speed droop at low engine speeds than at high engine speeds; different speed droop characteristics at minimum speed for high and for low injection quantities; and limiting of the speed of the engine to maximum and minimum values.

A controller for a diesel engine meeting the requirements must be matched to the particular type and power-rating of the diesel engine, so that it will properly control the engine to operate within its load-speed characteristic. During design, and construction at the factory, springs, cam discs, shims, and adjustment of limit positions of movable control parts can provide for such matching. It is of particular importance that such a regulator enables use of the engine to its full maximum power rating. This requires that the limit of the high-speed setting takes effect sharply and accurately, and is not approached gradually, so that the diesel engine can run up to its maximum designed speed, either with full, that is maximum, fuel consumption (for example under high loading) or with reduced fuel quantity supply, under intermediate loading.

It is an object of the present invention to provide a controller for diesel engines which can be readily adjusted and matched to particular types and power ratings of engines and in which the engine can be operated up to its maximum speed, under varying conditions.

Subject matter of the invention

The electronic controller for diesel engines has a high resistance source of electrical potential, which is substantially constant. The value of this potential controls the maximum amount of fuel which can be injected by the injection pump. The source of potential is connected to a control circuit, which regulates the value downwardly, depending upon operating conditions. This downward regulation is accomplished by connecting thereto a nonlinear circuit arrangement. The nonlinear circuit arrangement itself is connected to a source of potential the amplitude of which is proportional to the speed of the engine, and to external commands, for example as given by a pedal position. The nonlinear circuit arrangement is split into a group of nonlinear circuits. One of the nonlinear circuits is made to be responsive to both the speed of the engine and to the pedal position; and others only to the speed of the engine. The transfer functions of the circuits differ so that one circuit can be arranged to control the operation of the engine under starting, and to prevent smoking under unusual operating conditions; another circuit is commanded to control operating and maximum speed; and another, minimum speed at low injection quantities.

The transfer characteristics of the nonlinear circuits themselves can readily be adjusted by adjustment of the electronic circuit elements. They can become effective upon start of conduction of breakdown diodes in their circuits, that is when certain operating parameters (as determined by a signal applied to the breakdown diodes) are exceeded.

The structure, organization and operation of the invention will now be described more specifically in the following detailed description with reference to the accompanying drawings, wherein:

FIGURE 2 is a current (ordinate)-potential (abscissa) diagram of a breakdown diode;

FIGURE 3 is a typical load (ordinate)-speed (abscissa) diagram of a diesel engine, to be used with the controller of the present invention; and FIGURES 4, 5 and 6 are resistance (ordinate)-temperature (abscissa) diagrams useful in explaining temperature compensation.

Figure 1:
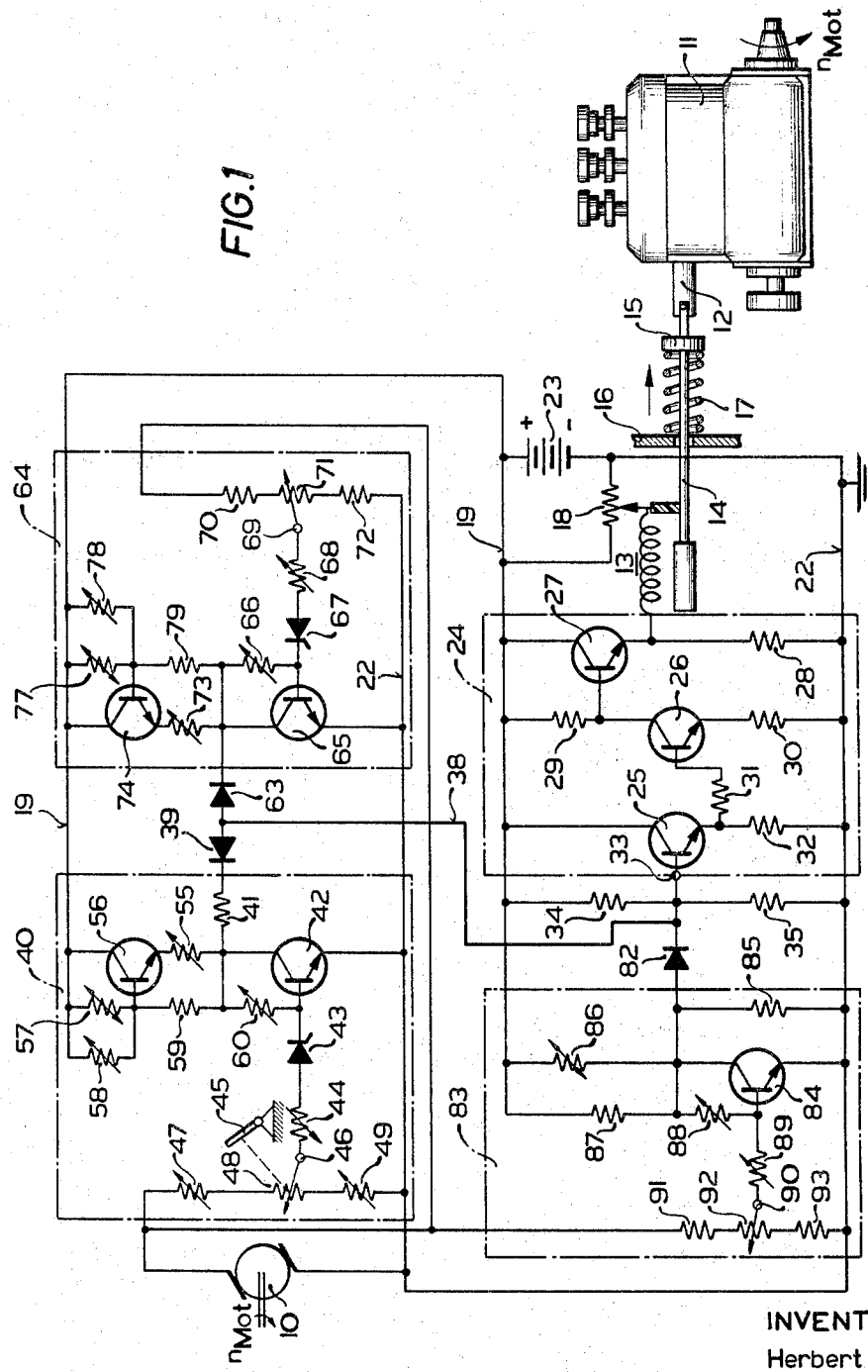
FIGURE 1 is a circuit diagram of the controller according to the present invention.
Figure 1A:
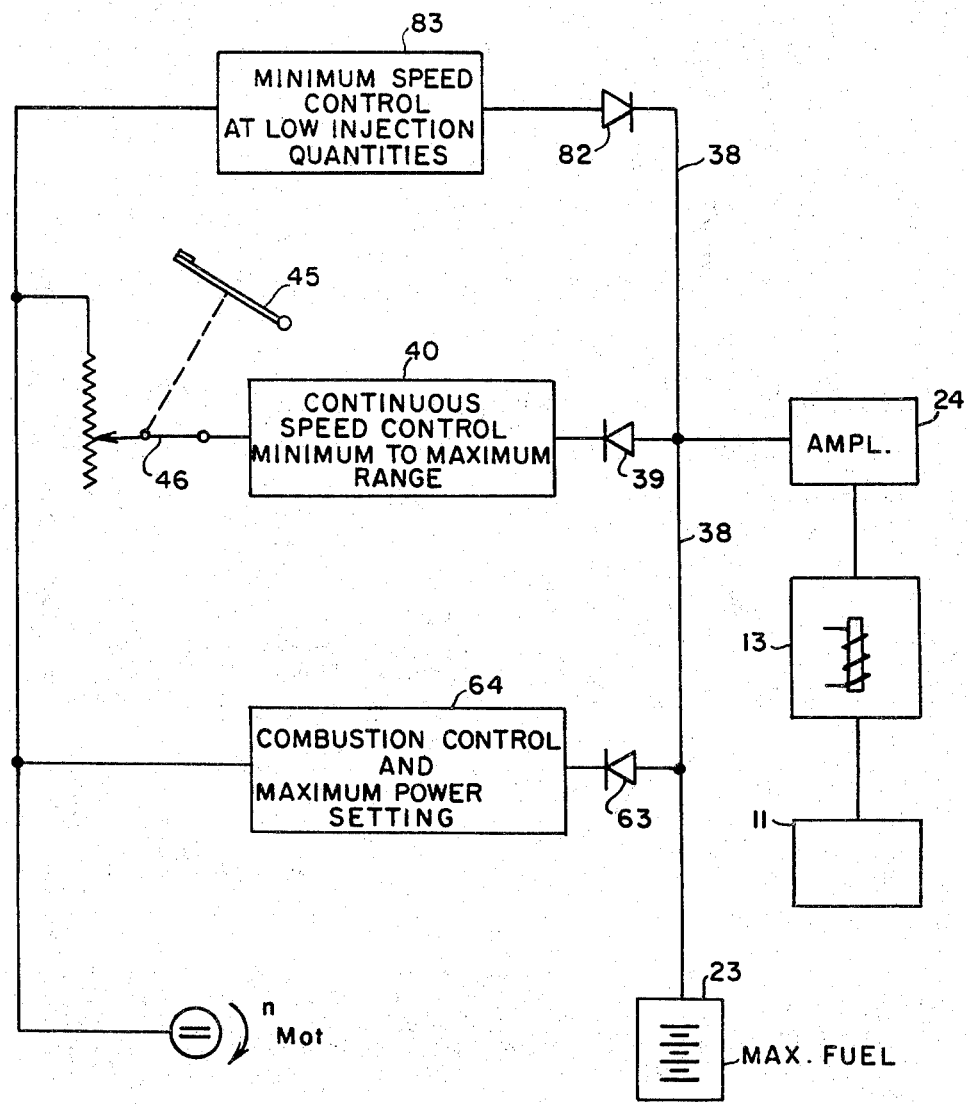
FIGURE 1a is a block diagram, highly schematic, of the control of FIGURE 1.

Referring first to FIGURE 1a, which is a highly schematic and abbreviated block diagram of the arrangement of the present invention: an electromechanical fuel controller, comprising an injection pump 11 and an electrical control element 13, such as a coil adjusting the setting of a control rod controls the amount of fuel injected to a diesel engine, not shown. The electromechanical fuel injection means is fed by an amplifier 24, the input of which is connected to a common junction 33. Common junction 33 is connected to a common control bus 38, which in turn is connected to two sources of potential. One of these sources, 23, is a source of constant potential having comparatively high internal resistance. The other source is a nonlinear circuit arrangement, consisting of three separate nonlinear circuits 40, 64, 83, each connected by a diode 39, 63, 82 to the control bus 38 and thus to junction 33. The diesel engine (not shown) is connected to a tachometer generator 10, providing a source of direct voltage, the amplitude of which is proportional to the speed of the engine, as schematically indicated by the arrow $n_{Mot}$.

The speed-proportional voltage generator 10 is connected to the nonlinear circuits 40, 64, 83. One of the nonlinear circuits, circuit 40 as shown in FIGURE 1a, has its input connected to a potentiometer 48, having a slidable tap point 46, the position of which is determined by an operator-adjustable controller 45, such as a fuel control pedal.

Nonlinear circuits 40, 64, 83 are so arranged that their internal resistance is less than that of source 23, when the diodes by which they are connected to the common control bus 58, and hence to junction 33, become conductive. Thus, they will serve to regulate the amount of fuel downwardly because the amplifier 24 will respond to the voltage which is determined by the source having the lowest internal impedance. The transfer characteristics of the nonlinear circuits 40, 64, 83 are so chosen that one of them, in FIGURE 1a, circuit 40, provides an operating and maximum speed control, as determined by the setting of the pedal 45; another one, circuit 64 in FIGURE 1a, provides for combustion control and for maximum power setting; that is, it prevents the application of an excessive amount of fuel, in dependence directly upon engine speed, to prevent emission of fumes and smoking. Nonlinear circuit 83, connected to a diode which is poled reversely with respect to the diodes interconnecting circuits and 64 with common control bus 38, is a minimum speed control, which becomes effective at low injection quantities to provide enough fuel to prevent drop of engine speed below a given value and thus, unstable operation. Nonlinear circuit 40 thus is responsive both to operator setting and engine speed; nonlinear circuits 64 and 83 are responsive only to engine speed.

The operation of the circuits, and their internal structure will now be described in detail with reference to FIGURE 1: The controller regulates the speed of the engine, $n_{Mot}$ of the diesel engine, not shown in the drawings. A tachometer generator 10 is driven by the diesel engine, so that its speed is the same, or proportional to the engine speed. It is supplied with fuel by a fuel injection pump 11. Fuel pump 11 has a control rod 12, the position of which is controlled by an electromagnet 13 to determine the amount of fuel being delivered. Control rod 12 is connected with electromagnet 13 by means of a linkage 14. It is biased in a position in which the fuel supply is a minimum by a spring 17, which bears against a fixed part 16 of the controller on the one side, and against a washer 15 connected to linkage 14 on the other. The direction in which the linkage 14 is urged by the spring is indicated by the arrow, which corresponds to 0 fuel delivered. Linkage 14 is mechanically connected to a tap point on a potentiometer 18. The tap point is connected electrically to one end of the winding of electromagnet 13.

A constant source of potential is provided, shown as battery 23, connected to a positive terminal or bus 19, and a negative terminal or bus 22. Potentiometer 18 is connected across buses 19 and 22.

The end of the winding of electromagnet 13, not connected to the potentiometer, that is the other end, connects to the output of amplifier 24, formed essentially of three transistors 25, 26, 27. Electromagnet 13 is connected to the emitter of transistor 27, which is further connected over a resistance 28 to negative line 22. The transistors are preferably n-p-n transistors; the collector of transistor 27 connects directly to the positive bus 19. The base of transistor 27 is connected directly with a collector of transistor 26, which itself is connected over its collector resistance 29 with positive bus 19, whereas its emitter is connected over emitter resistance 3v with negative bus 22. The base of transistor 26 is connected over resistance 31 with the emitter of transistor 25, which itself is connected over resistance 32 with negative line 22; its collector connects directly to the positive line 19, similar to the connection of transistor 27. The base of transistor 25 forms the input to the amplifier, shown as terminal 33.

The input 33 of amplifier 24 is connected to an intermediate point of a voltage-divider formed of resistances 34, 35, which, in turn, are connected across positive and negative buses 19, 22. In addition, the input to amplifier 24 is connected to a control bus 38.

Control bus 38 is connected by means of three diodes, 39, 63, and 82 (poled oppositely to diodes 39 and 63) to three nonlinear circuits 40, 64 and 83 respectively.

Diode 39 is connected with its anode to control bus 38; its cathode connects to the output of a first nonlinear circuit 40, formed by a resistance 41, which connects to the collector of an n-p-n transistor 42. The emitter of transistor 42 is connected directly to negative line 22; its base connects to the cathode of a break-down diode 43, the anode of which connects over an adjustable resistance 44 to a tap 46 on a voltage-divider formed of resistances 47, 48, 49. The voltage-divider 47, 48, 49 is connected across tachometer generator 10. The position of tap point 46 is adjustable by the operator of the diesel engine, for example by means of positioning pedal 45, as shown schematically by the dashed line interconnecting the slider from tap point 46 and pedal 45.

The current-voltage characteristics of breakdown diode 43 are seen in FIGURE 2. At a potential below breakdown, for example 0.6 volt, that is in region 52 of the curve, hardly any current is passed by the diode. A slight increase of voltage causes an abrupt rise in current (portion 53 of the curve). The knee of the curve, seen at 54, is a small transition period, which may cause difficulty in the operation of the regulator. In accordance with the present invention, the regulator is so designed that effects of the transition region, that is of the rounded knee 54, can be avoided.

The collector of transistor 42 is connected over an adjustable series resistance 55 with the emitter of an n-p-n compensation transistor 56. The collector of compensation transistor 56 is connected directly to positive line 19. An NTC-resistance 57 is connected in parallel to the collector-base path of transistor 56, and in parallel with it is a temperature-stable resistance 58. Resistance 59 is in parallel between the base of transistor 56 and the collector of transistor 42; an adjustable resistor 60 interconnects the collector of transistor 42 and its base.

The second nonlinear circuit 64 is connected to control bus 38 over diode 63, poled similar to diode 39, that is the anode connects to the control bus 38 and the cathode to the nonlinear circuit 64, that is, to the collector of an n-p-n transistor 65, the emitter of which is connected directly to negative bus 22. The base of transistor 65 is connected over a variable resistance 66 with its collector, as well as with a cathode of a breakdown diode 67, the anode of which connects over a variable resistance 68 to the tap 69 of a voltage-divider formed of resistances 70, 71, 72, which is connected across tachometer generator 10.

The collector of transistor 65 is connected over adjustable resistance 73 with the emitter of an n-p-n compensation transistor 74, the collector of which is connected directly to the positive line 19. An NTC-resistance 77 is in parallel to the collector-base path of transistor 74, and a temperature-stable parallel resistance 78 is connected further in parallel thereto. Further, resistance 79 connects the base of transistor 74 to the collector of transistor 65.

The control bus 38 is further connected to nonlinear circuit 83 over a diode 82 poled inversely to the polarity of diodes 39, 63. Thus, the cathode of diode 82 connects to control bus 38; the anode connects to the output of the nonlinear circuit 83, formed by the collector of an n-p-n transistor 84. The emitter of transistor 84 connects directly to the negative line 22. In parallel to the emitter-collector path, is a resistance 85. The collector of transistor 84 connects over an NTC-resistance 86 to positive line 19; a temperature-stable resistance 87 is connected in parallel to the NTC-resistance 86. An adjustable resistance 88 interconnects the collector and base of transistor 84. The base is further connected over an adjustable resistance 89 to the tap 90 of a voltage-divider formed of resistors 91, 92, 93, again connected across the tachometer generator 10.

*Operation of circuit according to FIG. 1*

Let it be assumed that the battery 23 delivers a constant potential, for example 12 volts. Resistances 34, 35 have a comparatively high value. The intermediate point, to which input 33 and control bus 38 are connected, is so arranged that, under no-load condition, input point 33 has a voltage of ten volts with respect to negative line 22.

When the diesel engine—not shown— starts, its speed $n_{Mot}$ is still small; the output potential of the tachometer generator 10 will not be sufficient in order to bring the breakdown diodes 43, 67 beyond their nonconductive region 52 (FIGURE 2) and into the conductive region 53. Thus, no base current will flow in transistor 42, which remains blocked, and the potential between its collector and its emitter is thus essentially the same as that of the battery 23, thus, 12 volts. Diode 39 is thus blocked, since the potential on its cathode (12 volts) is greater than is the potential of its anode (10 volts). The potential at the base of transistor 65, in nonlinear circuit 64, is so adjusted by means of the resistance 66 that it is just barely conductive so that between its collector and emitter, a potential of 9 volts is applied. Diode 63 thus is conductive, since its cathode has a lower potential (9 volts) than its anode (10 volts). Since resistances 34 and 35 are of high resistance value, the potential at input 33 of amplifier 24 is determined by that of the input transistor 65, that is between input 33 and negative bus 22 the potential will drop to 9 volts. The dropping of this potential causes a shift of the position of the control rod 12 in the direction of larger fuel injection, that is towards maximum injection, due to current supplied to electromagnet 13 which pulls its armature and with it the linkage 14 against the tension of the spring 17 towards the left (FIGURE 1) until the tap of potentiometer 18 determines a potential which is approximately that of the emitter of transistor 27, so that the transistor 27 does not receive current anymore. Thus, the combination of the tap on potentiometer 18, and its connection across transistor 27 serves as a feedback to positively determine the position of rod 12 of the injection pump.

As the speed of the diesel engine increases, the output potential of tachometer generator 10 increases likewise. When a certain potential is reached, breakdown diode 67 becomes conductive and thus transistor 65 receives a higher base current. The potential between its collector and its emitter further decreases, somewhat proportionally to the speed of the engine $n_{Mot}$. Referring to FIGURE 3, the first adjusted fuel quantity, corresponding to a potential at control bus 38 and input 33 of 9 volts, is represented by line 96. At point 97, breakdown diode 67 becomes conductive and the increased conductivity of transistor 65 causes a drop in characteristic shown by curve 98, providing a smaller amount of fuel to approach the full-load point. The slope of the full-load approach curve 98 can be adjusted by means of the adjustable resistance 68 (FIGURE 1, nonlinear circuit 64); the position of point 97 can be adjusted by setting the tap 69 on potentiometer 71 of voltage-divider 70, 71, 72.

If the manual control, that is pedal 45, is in its maximum fuel-supply position, breakdown diode 43 will become conductive only at high speed. Up to then it remains blocked, so that the potential between the collector and the emitter of transistor 42 will remain at 12 volts. This is shown in FIGURE 3 by the dashed line 99, which is above line 96, corresponding to the supply of fuel actually injected. When breakdown diode 43 does become conductive, transistor 42 has base current applied thereto and likewise becomes conductive, so that the potential between its collector and emitter decreases. When this potential decreases below that of transistor 65, diode 39 becomes conductive, and diode 63 blocks. The potential at the input 33 of amplifier 24 will then follow the potential existing between the collector and emitter of transistor 42, which decreases depending upon the adjustment of adjustable resistor 44. The adjustment of this resistor 44 determines the slope of various operating points, as determined by the position of pedal 45. Representative lines, indicating the performance of the engine in dependence on the position of the pedal 45 are shown by lines 100. Changing the position of pedal 45 changes the point of tap 46 on resistance 48, and thus the point at which diode 43 becomes conductive. This then determines the particular line 100, located within the speed-load field of the engine, the boundaries of which are determined by the heavy lines 96, 97, 98, 102, 105, 101. The magnitude of resistance 47 determines the position of idle-adjustment line 101; the size of resistance 49 determines the position of maximum speed control characteristic line 102 (FIGURE 3). A mechanical overspeed limit control can also be added in order to have an extra control member to limit maximum speed. Such maximum speed limiters are mechanically simple and increase the costs of the controller only slightly.

The voltage division ratio of voltage-dividers 47, 48, 49 is not linearly proportional; thus moving pedal 45 causes nonlinear response with respect to speed of the engine, as determined by the voltage delivered by tachometer generator 10. This nonlinear response can be utilized to compensate for nonlinearity in the performance characteristics of the engine, as reflected by the characteristic lines 100. The voltage droop thus decreases with increasing speed of the engine, as required for satisfactory diesel motor operation.

The arrangement of FIGURE 1 has the advantage that the effect of knee 54 of the breakdown diode (FIGURE 2) can be eliminated. The potential between the collector and the emitter of transistor 42, within nonlinear circuit 40, will become effective only when it is less than the potential between the collector and emitter of transistor 65. Initial conduction of the breakdown diode 43 will not have an effect on the position of injection pump 11; such an effect will arise only when some substantial current will already flow through the breakdown diode 43, that is when it is already in the current-conductive region 53, because only then will diode 39 become conductive and the second diode 63 will become blocked. The rounded portions of the curve, indicated in FIGURE 3 at 103, due to the rounding of lines 100 caused by the knee 54, have no effect on the position of the pump 11. This is particularly important because point 104, that is the point of maximum speed and maximum torque, is the point at which the engine can furnish maximum power. At this point the maximum-power capability of the engine should be used and a rounding off of that portion of the curve, due to control action (and not required by engine performance and characteristics) should be avoided. The present invention permits use of the engine to its maximum performance.

Under normal operating conditions, the diode 82 is always blocked, since transistor 84, over resistance 89, has a strong positive potential applied thereto and is thus fully conductive, so that only a very small potential will arise between its collector and its emitter. This small potential is not sufficient to control diode 82 to become conductive. Should the engine, however, reach a very low speed, the potential between the base and the emitter of transistor 84 may be so small that its collector current decreases and that the potential between collector and emitter, with decreasing speed of the engine and thus decreasing potential of tachometer generator 10, increases.

If this potential increases to become larger than the potential between collector and emitter of transistor 42, diode 82 becomes conductive and diode 39 will become blocked. The potential to the input 33 of the amplifier 24 is thus controlled by the potential between collector and emitter of transistor 84. This determines the idling characteristic 105. The transition point 106 to the idling characteristic line 101 can be adjusted by means of potentiometer 92, and the slope, that is the speed droop, with the adjustable resistor 89. The degree of temperature compensation of nonlinear circuit 83 is not complete, so that with increasing temperature, the slope of idle characteristic 105 decreases, which increases the idling characteristics of the diesel engine. The resistance 85, in parallel to transistor 84, limits the output potential of the nonlinear circuit 83 to the value shown in FIGURE 5 at 107. Resistance 85 is the lower portion of a voltage-divider, formed of the entire resistance of the parallel resistors 86, 87 and resistance 85. So long as transistor 84 is blocked, that is in its high-resistance condition, the potential at resistance 85 is determined by this voltage-divider 85, 86, 87. This potential is so adjusted that point 107 (FIGURE 3) corresponds to a larger fuel injection setting than the transition point 106, yet prevents increase of the output potential of the nonlinear circuit 83, even with very small speeds, to a value which corresponds to the maximum fuel injection value, line 96 (FIGURE 3) or even larger.

Nonlinear circuits 40, 64 contain temperature-compensation circuits which are exact and compensate for temperature variations over a wide range. The collector resistances of non-linear circuits 40, 64, consisting respectively of a series circuit, of a series resistance and the emitter-collector path of a transistor, are so adjusted that as the temperature increases, the collector resistance decreases correspondingly as the collector current of the associated transistors 42, 65 increases in accordance with temperature. The output potential of transistors 42, 65 thus can be maintained constant, or approximately constant, within a wide temperature range, for example −20° C. to +80° C.

The temperature compensation circuit will be explained in connection with nonlinear circuit 40, FIGURE 1, it being understood that the compensation circuit of nonlinear circuit 64 is similar. Considering both figures, FIGURE 1, and FIGURES 4 to 6, it is seen that the collector current of a transistor rises approximately linearly with temperature, assuming constant base current. Thus, its collector resistance must decrease approximately linearly, if the output potential should remain constant independent of temperature. A common hot-wire resistance, such as a negative temperature resistance known commercially as a "NTC-resistance" is not sufficient; the characteristic curve of such an NTC resistance is shown at 109 in FIGURE 4.

The curve 109 in FIGURE 4 must be linearized before such a resistance can be used for temperature compensation over a wide range. This is obtained by placing a resistance in parallel therewith which is stable with temperature. The size of this resistance then determines the linear region within the temperature curve 110 shown in FIGURE 5. Strictly speaking, this curve is not linear, but slightly deviates above and below the ideal average linear curve shown in dashed line at 111, but for commercial purposes it is close enough. Referring again to FIGURE 1, NTC hot-wire resistance 57 and parallel resistance 58 are provided in nonlinear circuit 40; NTC resistor 77 and parallel resistance 78 are provided in nonlinear circuit 64.

In series with the parallel combination of resistances 57, 58, and 77, 78, respectively, another resistance, 59 or 79, respectively, is provided. These resistances determine the working point of the associated compensation transistor 56 or 74, respectively. This working point is so chosen that the respective transistor can be controlled both in negative and positive direction as far as possible, that is it is biased to operate as a class A amplifier. If the adjustment of the temperature range is to be changed, for example not as shown in FIGURE 5 from −20° C. to +80° C., but for example from 0° C. to 50° C., parallel resistances 58 and 78 must be readjusted. This results in a new total resistance of the parallel circuit of resistors 57, 58 (77, 78, respectively), so that by means of resistor 59 (79, respectively), the working point of the transistor associated therewith can also be reset.

The average, or interpolation line 111 (FIGURES 5 and 6) has a certain slope, and it illustrates that the temperature excursion of the resistance combination is already quite large. The amplification effect of the associated compensation transistor 56 (74, respectively), further increases the slope, as seen in FIGURE 6 at line 112. In order to obtain the proper slope matching the temperature nonlinearity of transistors 42 or 65, respectively, and its associated circuit elements, that is essentially resistances 44, 47, 48, 49 and breakdown diode 43, a characteristic having a slope shown in connection with curve 113 may be necessary. In order to obtain a desired slope, each temperature compensation transistor, 56 or 74 respectively, is provided with a feedback resistance. A simple solution is a current feedback by means of series resistors 55 (or 73, respectively), which is adjustable to set the negative feedback. Resistances 60, 66 and 88 determine the working points of transistors 42, 65 and 84.

Injection pump 11 and tachometer generator 10 may be driven directly from the engine, that is they may have a speed $n_{Mot}$, or they may be driven from a speed takeoff which is proportional to that of the engine, for example from the cam shaft of the engine.

The tachometer generator and the electronic regulator can be built in one structural unit, together with injection pump 11. This provides a compact unit having continuous and reliable operation. The electromagnetic fuel control can be replaced by an electrical control for a hydraulic amplifier with an electrical input, which needs only small control currents. Hydraulic working pressure can be obtained readily from the injection pump. Substantial parts of the circuits can be formed as integrated circuits which use but little current. If desired, a branch circuit from the tachometer generator can be used as a source of operating potential for the controller, so that further connection to the battery of the vehicle or other power supplies will be unnecessary.

Instead of n-p-n transistors, as illustrated in the example above, p-n-p transistors can also be used and the respective circuit elements and current sources be connected in reverse polarity.

I claim:
1. In a controller for diesel engine to control the amount of fuel injected, electromechanical means controlling the amount of fuel to be injected (11, 12, 13, 14), and an operator-adjustable fuel controller (45) to control the speed of operation of the engine within the speed-load characteristics thereof,
the improvement comprising
a source of fixed potential having high internal resistance (23, 34, 35); said source being connected (38, 33, 24) to said electromechanical fuel control means and being set to provide a potential controlling said electromechanical fuel control means to inject a maximum amount of fuel; means generating a voltage (10) proportional to the speed of said engine; and a nonlinear circuit arrangement having an output further connected (38, 33, 24) in parallel with said source of fixed potential (23, 34, 35) to said electromechanical fuel control means (11–14), said nonlinear circuit arrangement being connected to said speed-proportional generating means (10), the internal resistance of said nonlinear circuit arrangement being variable to be less than that of said source of fixed potential, and varying in dependence on the speed of said engine.

2. Controller as claimed in claim 1, including an electromechanical transducer (46, 48) connected to said fuel controller (45);
said nonlinear circuit arrangement including a pair of nonlinear circuits (40, 83), the input to one of said nonlinear circuits (40) being connected to both said speed-proportional voltage-generating means (10) and to said electromechanical transducer (46–48) so that its output impedance will be a function of both engine speed and operator-controlled controller position setting; the other of said nonlinear circuits (83) having its input connected solely to said speed-proportional voltage-generating means (10) so that its output impedance will be a function of engine speed only.

3. Controller as claimed in claim 2, including coupling diodes (39, 63, 82) interconnecting the nonlinear (40, 64, 83) circuits in parallel with said source of fixed potential (23, 34, 35).

4. Controller as claimed in claim 3, wherein said nonlinear circuit (40) responsive to both the position of said electromechanical transducer (46–48) and to said speed-proportional voltage (10) includes a transistor (42), a breakdown diode (43) connected in the control circuit of said transistor (42); and a variable voltage-divider (47, 48, 49) coupled across said speed-proportional voltage generator (10), said electromechanical transducer (46–48) including a resistance forming part of said voltage divider and having a tap point (46) connected to said breakdown diode (43); the coupling diode interconnecting said nonlinear circuit being poled to become conductive when the potential at the output electrodes of the transistor (42) becomes less than the potential of said source of fixed potential of high internal resistance, whereby the effect of the lower internal resistance of the transistor (42) will override the effect of the potential developed from said high-internal resistance source and the output voltage of said non-linear circuit will be applied to said electromechanical fuel control means to regulate said fuel control means to inject a lesser amount of fuel to said engine.

5. Controller as claimed in claim 2, including a further non-linear circuit (64) having its input connected to said speed-proportional voltage-generating means (10); adjustable signal transfer means (69, 70, 71, 72) included in said third nonlinear circuit to transmit a predetermined portion of said voltage applied by said speed-proportional voltage-generating means, said pre-determined portion of said speed-proportional voltage being transmitted by said adjustable signal transfer means and being of a value with respect to the entire speed-proportional voltage to control said nonlinear circuits to have an output potential which is less than that of any of said other nonlinear circuits at predetermined speeds of said engine below the maximum designed speed thereof.

6. Controller as claimed in claim 5, wherein said further nonlinear circuit (64) includes a transistor (65), a breakdown diode (67) connected in the control circuit of said transistor (65) and a tapped voltage-divider (70, 71, 72) coupled across the speed-proportional voltage generator (10), the tap point (69) being connected to said breakdown diode (67); a coupling diode (63) is provided interconnecting the output of said transistor (65) in parallel to said source of fixed potential (23, 34, 35); the tap point (69) of said voltage-divider being set to control said transistor to have an input potential which is less than that of any of said other nonlinear circuits at predetermined speeds of said engine below a maximum designed speed thereof.

7. Controller as claimed in claim 2, including a third nonlinear circuit (83) having its input connected to said speed-proportional voltage-generating means; adjustable signal transfer means (89, 90, 91, 92, 93) included in said third nonlinear circuit to transmit a predetermined portion of said voltage applied by said speed-proportional voltage-generating means, a predetermined portion of said speed-proportional voltage transmitted by said adjustable signal transfer means being of a value, with respect to the entire speed-proportional voltage, to control said nonlinear circuit to have an output potential which is greater than that of any of said other nonlinear circuits at predetermined speeds of said engine below a certain minimum designed speed thereof.

8. Controller as claimed in claim 7, wherein said third nonlinear circuit (83) includes a transistor (84), said adjustable signal transfer means (89, 91, 92, 93) including a tapped voltage-divider connected across the said speed-proportional voltage generator and the tap point thereof being connected to the input of said transistor (84); a coupling diode (82) being provided to interconnect the output of said transistor (84) and in parallel with said source of fixed potential (23, 34, 35); said diode being poled in a reverse connection with respect to the diode interconnecting said other nonlinear cricuits.

9. Controller as claimed in claim 8, including temperature-compensation resistances interconnecting said transistor and its source of operating potential to approximately compensate for temperature variation.

10. Controller as claimed in claim 9, wherein said temperature-compensation resistances include a negative temperature coefficient resistance in parallel with a temperature-stable resistor, said parallel resistance combination forming the collector resistance for said third transistor.

11. Controller as claimed in claim 2, said pair of nonlinear circuits, each including a transistor in the output circuit thereof; a temperature-compensation transistor (56, 74) having its emitter-collector path connected as the collector resistor for said transistor (42, 65); and a parallel combination of a negative temperature coefficient resistance and a temperature-stable resistance interconnecting the base and the collector of said temperature-compensation transistor.

12. Controller as claimed in claim 11, wherein the working point of said temperature-compensation transistor is adjusted so that said temperature-compensation transistor will operate as a class A amplifier.

13. Controller as claimed in claim 11, including an adjustable resistance (55, 73) in series with the emitter-collector path of said temperature-compensation transistor (56, 74), said adjustable resistance forming a negative feedback resistor; and a voltage-divider network (57, 58–59; 77, 78–79), one branch of said voltage-divider network being formed by said parallel combination of temperature-sensitive and temperature-stable resistances, connected in parallel with the collector and the free end of said negative feedback resistance.

14. Controller as claimed in claim 1, wherein said electromechanical means controlling the amount of fuel to be injected (11, 12, 13, 14) and said nonlinear circuit arrangement form one structural unit.

15. Controller as claimed in claim 1, wherein said means generating a voltage proportional to the speed of said engine and said electromechanical means controlling the amount of fuel to be injected are interconnected as one structural unit and said means generating said speed-proportional voltage is driven by the fuel injection means of said engine.

References Cited
UNITED STATES PATENTS

| | | | |
|---|---|---|---|
| 2,911,966 | 11/1959 | Pribble | 123—32 |
| 3,004,720 | 11/1961 | Knapp | 123—32 |
| 3,338,221 | 8/1967 | Scholl | 123—32 |

MEYER PERLIN, *Primary Examiner.*